(12) United States Patent  
Chase (10) Patent No.: US 8,882,028 B2  
(45) Date of Patent: Nov. 11, 2014

(54) AIRCRAFT EMERGENCY AND BACKUP SECONDARY POWER APPARATUS

(75) Inventor: James D. Chase, Reno, NV (US)

(73) Assignee: Aerion Corporation, Reno, NV (US)

( * ) Notice: Subject to any disclaimer, the term of this patent is extended or adjusted under 35 U.S.C. 154(b) by 447 days.

(21) Appl. No.: 12/806,223

(22) Filed: Aug. 9, 2010

(65) Prior Publication Data

US 2011/0067393 A1   Mar. 24, 2011

Related U.S. Application Data

(60) Provisional application No. 61/277,030, filed on Sep. 21, 2009.

(51) Int. Cl.
*B64D 41/00* (2006.01)

(52) U.S. Cl.
USPC .............................. 244/58; 244/53 B; 290/55

(58) Field of Classification Search
USPC ........... 244/53 R, 58, 53 A, 53 B; 416/170 R; 415/122.1, 124.1; 290/44, 55; 60/484
See application file for complete search history.

(56) References Cited

U.S. PATENT DOCUMENTS

| | | | |
|---|---|---|---|
| 4,754,940 A * | 7/1988 | Deter | 244/75.1 |
| 5,150,859 A * | 9/1992 | Ransick | 244/58 |
| 8,118,253 B1 * | 2/2012 | Casado Abarquero et al. | 244/58 |
| 2009/0026770 A1 * | 1/2009 | Huntemann | 290/55 |

FOREIGN PATENT DOCUMENTS

WO   WO 2007085422 A1 *  8/2007

* cited by examiner

*Primary Examiner* — Brian M O'Hara
(74) *Attorney, Agent, or Firm* — William W. Haefliger

(57) ABSTRACT

In combination, an aircraft and a rotatively combined electrical power/generator and hydraulic motor/pump configured to provide either hydraulic power from electrical power, or electrical power from hydraulic power, installed in said aircraft.

7 Claims, 6 Drawing Sheets

Fully open – Low speed air driven emergency or backup

FIG. 6b

Partially open
Cruise: air driven electric or hydraulic backup

FIG. 6c

Closed: no air drive
Electric → hydraulic backup
or hydraulic → electric backup
normal flap position
fan idling

FIG. 7 ics and the ACMP's) resulted in using flight operable APU's, which must be running continuously during extended overwater flight legs. APU's are relatively in-efficient at generating electrical power, thus this system results in reduced range and fuel economy, and increased exhaust emissions.

AIRCRAFT EMERGENCY AND BACKUP SECONDARY POWER APPARATUS

This application claims priority from provisional application Ser. No. 61/277,030 filed Sep. 21, 2009.

BACKGROUND OF THE INVENTION

This invention relates generally to improvements in providing auxiliary electrical and hydraulic power sources for aircraft systems. One improvement concerns a compound hydraulic motor/generator mechanically coupled to an electric motor/generator. The device is termed a Compound electro/hydraulic Motor Generator Pump, with the acronym CMGP. This system allows either electric power to be supplied from a hydraulic power source, or hydraulic power from an electric power source. A second improvement concerns the combination of the CMGP with a ducted ram air turbine drive, defining means to provide continuous electrical and hydraulic power to the aircraft in the event of total failure of all engine driven power sources.

Modern aircraft increasingly rely on powered systems to provide the forces for aircraft control. Early powered systems relied on various forms of mechanical backups, such as traditional cables, to allow pilots to retain control of the aircraft when the powered systems failed. These mechanical backups have many drawbacks in terms of aircraft complexity, weight, space allocation and energy efficiency. Mechanical backup systems become especially cumbersome when integration with modern computer controlled fly-by-wire systems is desired. For this reason many modern aircraft are dispensing with mechanical backup in favor of purely powered controls. These aircraft may have electronically controlled, hydraulic powered surface actuators, electronically controlled electric powered actuators, or combinations of both.

With powered controls, it is required that sufficient power always be available to maintain control of the aircraft in the event of foreseeable failures. The certifying authorities use the term "extremely improbable" to describe that no failure, or series of failures, can result in the loss of the aircraft. For purposes of design, "extremely improbable" is less than 1 occurrence in 1 billion flight hours ($10^{-9}$). Power to control the aircraft must be shown to be continuously available in the event that all engines, including auxiliary power units (APU), are failed. This requirement has manifested itself in incidents where aircraft have exhausted their fuel supplies, or atmospheric effects such as volcanic ash have resulted in all engine/APU's flaming out. In some aircraft where dispatch reliability is a paramount requirement, the reliability hurdle is further increased by requiring that it be acceptable to dispatch the aircraft with one power system not functioning, typically a failed engine driven generator. This requirement means that with one electric generator (or hydraulic pump) failed, the aircraft must meet the stringent $10^{-9}$ requirement.

Prior to these requirements, transport category aircraft typically were fitted with one hydraulic pump and one electrical generator on each engine. A flight operable APU could supply a third electrical generation source, and backup hydraulic power was supplied by one or more electric motor driven hydraulic pumps (ACMP). For two engine aircraft operating under ETOPS (extended over water operations), the need to assure continuous electrical power (both for electronics and the ACMP's) resulted in using flight operable APU's, which must be running continuously during extended overwater flight legs. APU's are relatively in-efficient at generating electrical power, thus this system results in reduced range and fuel economy, and increased exhaust emissions.

Regardless of how many engine driven generators, however, the requirement to supply un-interrupted power in case of all engine and APU failure results in adding a Ram Air Turbine (RAT). The RAT is typically a windmill type propeller deployed outside the aircraft which can drive either an electric generator, hydraulic pump, or both. Because the system must generate sufficient power at relatively low airspeeds, the drag of the RAT and loads become excessive unless it is stowed within the aircraft during all normal flight. This renders the RAT inoperable except for emergency, which incurs two drawbacks. First, the weight, cost, and complexity of the RAT must be borne by the aircraft even though it is virtually never used. Second, the contribution the RAT makes to overall reliability in a statistical Hazards and Safety analysis is limited due to it not normally being operated. There is always an uncertainty about its "availability" since it typically cannot be given a preflight or an in flight check. To improve its statistical availability in the hazard analysis, some operators are requested to occasionally deploy the RAT at the end of a mission to establish that it works. Unless outfitted with a motorized retraction system, the RAT must be re-stowed by the ground crew prior to the next flight.

Another drawback of the conventional external windmill type RAT is that it is not ideal for supersonic flight, and although possible to design for deployment supersonically, the technical challenges of the weight from high drag loads and preventing windmill overspeed makes it less practical for supersonic aircraft.

SUMMARY OF THE INVENTION

It is a major object of the invention to provide a system or systems overcoming the above problem and difficulties. Basically, the invention is embodied in a rotatively combined electrical power/generator and hydraulic motor/pump configured to provide either hydraulic power from electrical power, or electrical power from hydraulic power, installed in the aircraft. As will be seen, an air drive turbine is typically housed in an air flow duct within the aircraft and provided with inlet and exit openings to direct outside air to the turbine for driving a rotatively combined electrical motor/generator and hydraulic motor/pump.

Another object is to provide a variable air exit flap to control the power of the air drive turbine. Also, a variable air inlet flap controlled in concert with said exit flap to control air flow and power to the air drive turbine.

A further object is provision of a system to provide both electric and hydraulic backup power simultaneously during aircraft flight, comprising a) a rotatingly combined electrical power/generator and hydraulic motor/pump CMGP unit installed on the aircraft in association with an aircraft engine, to be driven in response to engine operation for supplying either
  i. electrical back-up power from hydraulic input power, or
  ii. hydraulic power back-up from electrical input power,
b) means operatively coupling the unit both electrically and hydraulically to an aircraft electrical generator and to an aircraft hydraulic pump.

As will be seen, the aircraft may have multiple engines, with one of the referenced units provided for each engine. The unit may be installed in association with a ducted ram air turbine in a duct contained within the aircraft, with duct air inlet and outlet flaps operable in conjunction with unit operation.

A clutch may be operatively connected between the turbine and unit, as will be seen.

DETAILED DESCRIPTION

Figure 1:
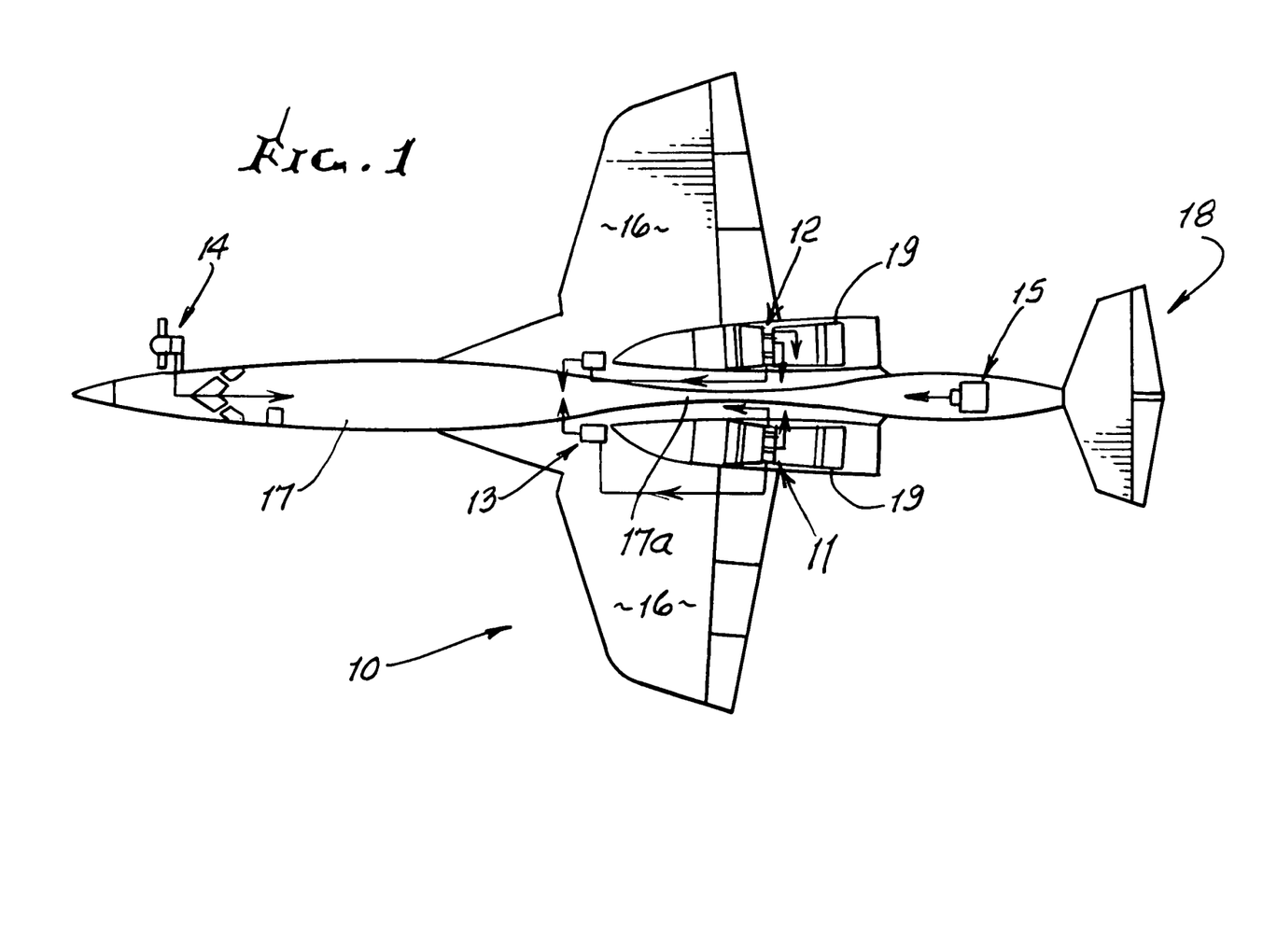
FIG. 1 shows a current aircraft power system with power supplies.

Referring first to FIG. 1, with increasing challenges of providing enough power redundancy to meet certification requirements and dispatch with a failed generator, recent aircraft engines have been supplied with accessory drive pads for an additional generator, thus the current two engine aircraft 10 typically have a total of four engine driven generators 11, two engine driven hydraulic pumps 12, two or more electrically driven hydraulic pumps 13, a RAT 14, and an APU 15. The aircraft 10 is shown with wings 16, fuselage 17 with reduced width at 17a, tail assembly 18, and two engines 19.

The extra engine driven generators improve overall power availability from generator failure but both generators on each engine share common failure modes of engine shut-down, engine gearbox and gearbox drive failures. They do not provide additional power in the case of all engine failure.

Not all engines are supplied with two generator pads, and for applications of these in twin engine aircraft additional sources of electrical power beyond the engine driven generators are required. One of the critical cases for these aircraft is one engine failed and the opposite engine generator failed.

Figure 2:
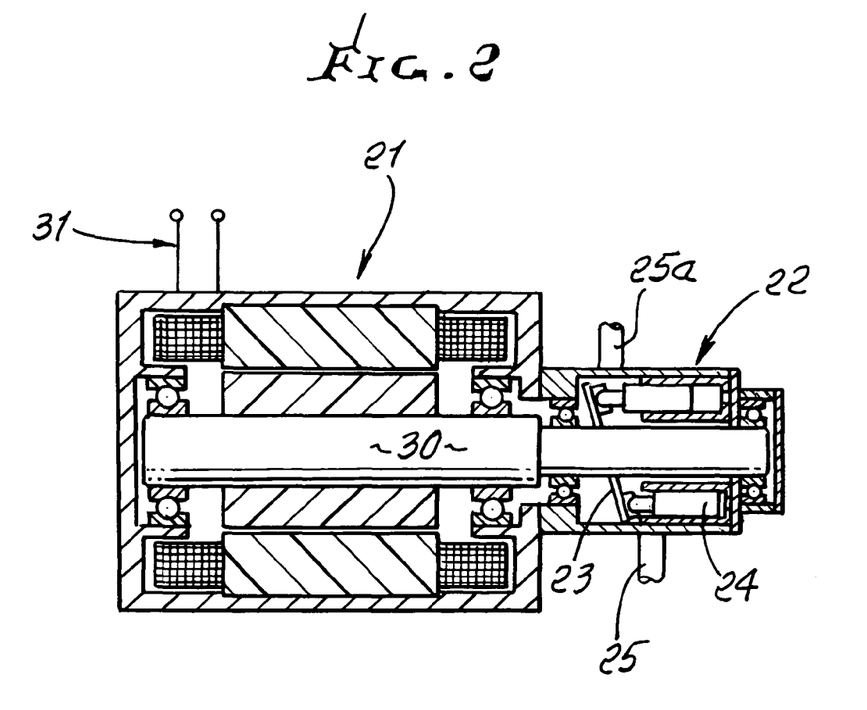
FIG. 2 is a section taken through a compound Hydro/Electric Motor-Generator-Pump (EMGP)

Compound Electro/Hydraulic Motor Generator Pump:

Referring to FIG. 2, an aspect of the invention concerns coupling an electric motor/generator 21 with unit 22 a hydraulic motor/generator to a common drive for the purpose of supplying backup power of aircraft to systems, either electrical power from hydraulic input power or the reverse, hydraulic power from electrical input power.

The electric unit is similar in function to a turbine engine starter-generators, in being able to either work as a motor supplying mechanical work from an electrical source or the reverse, supplying electricity from the mechanical drive. Likewise the hydraulic unit 22 is able to work as a hydraulic pump supplying hydraulic power or as a motor supplying mechanical power from a hydraulic source. The combination is termed a Compound Motor-Generator-Pump (CMGP). A coupling shaft is shown at 30.

The unit provides an extra engine driven generator by way of the engine driven hydraulic pump, or a backup hydraulic pump via the aircraft electrical supply, which includes the engine driven generators, backup batteries, APU driven generator, or RAT. As shown, the hydraulic unit preferably is a conventional positive displacement pump with a swash plate 23 and radial piston unit 24, which supplies power or is driven depending on the whether the schematically shown supply hydraulic line 25 supplies high fluid pressure with low pressure return at 25a, or the opposite.

Availability is assured by keeping the unit functioning at low power levels throughout the flight. Sensors monitor to assure rotation and electrical power in/out, and hydraulic pressure in/out of the unit.

Figure 3:
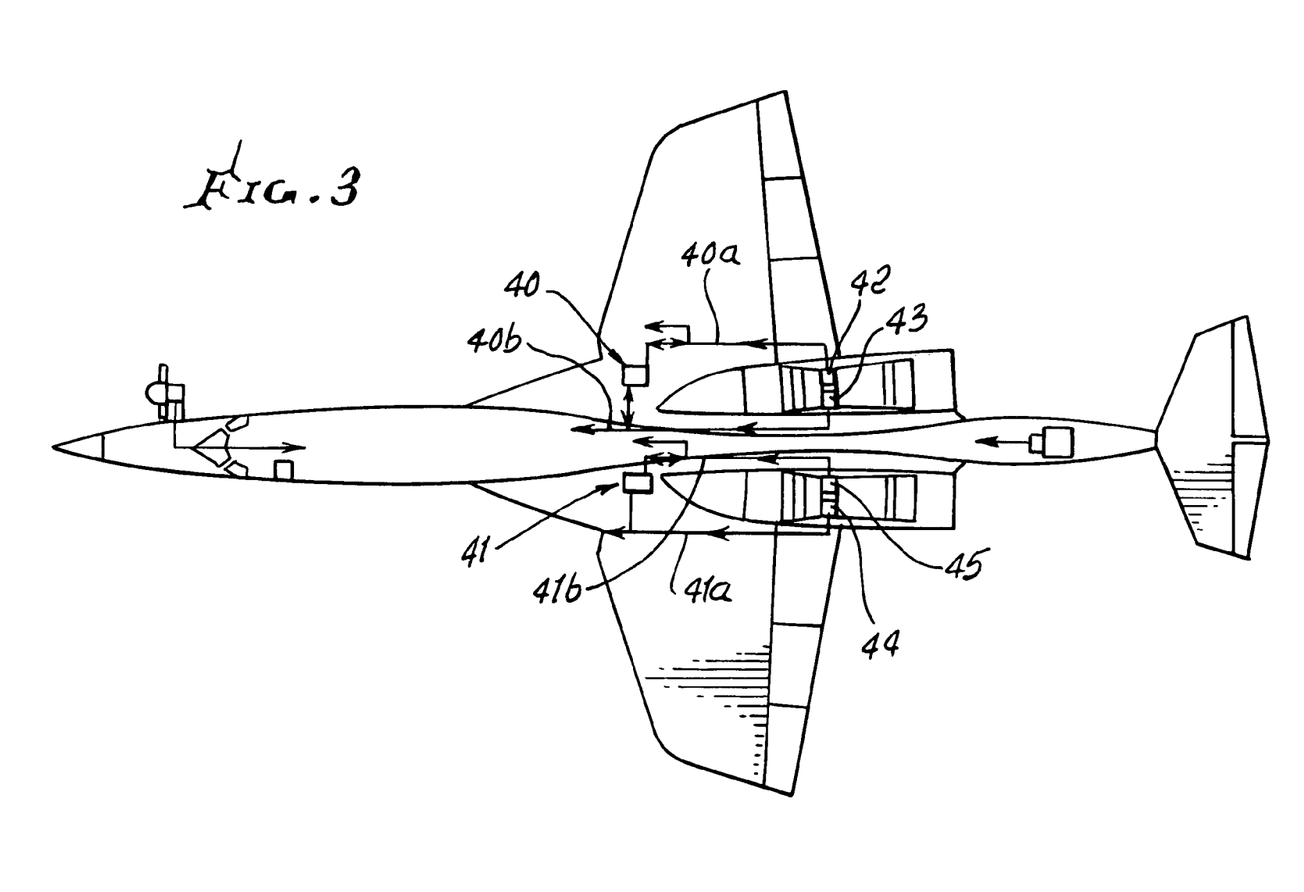
FIG. 3 is a plan view of an aircraft, having power system supplies with two EMGP's.

Two CMPG units per aircraft as at 40 and 41 in FIG. 3, allow back-up electrical power via lines 31 and back-up hydraulic power at 25 in FIG. 2 to be available to the aircraft throughout the flight envelope. Unit 40 is operatively connected, as at 40a and 40b to an engine driven hydraulic pump 42 and an engine driven generator 43 for one engine; and unit 41 is operatively connected, as at 41a and 41b to an engine driven hydraulic pump 44 and an engine driven generator 45, for the second engine. The unit solves the one engine failed/opposite generator failed problem, or condition, by supplying electrical power from the good engine's hydraulic pump as well as its engine driven generator. See FIG. 3.

Note that as compared to the current four engine driven generator scheme in FIG. 1, the total number of electrical and hydraulic machines is reduced from 12 to 10. This reduces complexity and weight. It also reduces the space and weight of the engine accessory gearbox by eliminating the extra drive pad, and reduces failure modes of engine accessory gearbox failure due to additional gear trains for the extra generator pad.

The compound motor generator pump unit can be combined with a ducted ram air turbine 50 (see FIG. 4) to provide backup drive, independent of all engine and APU drives. The duct 51 is typically provided to be flush with the aircraft outer surface 52 for normal operation and deployment of a large exit flap 53 to induce additional flow when needed. A deployable inlet flap 54 is also provided to be integrated to improve low speed duct flow and optimize the area of the exit opening to the inlet opening. Flap actuators and air actuator control are shown at 56, 57 and 58.

Figure 4:
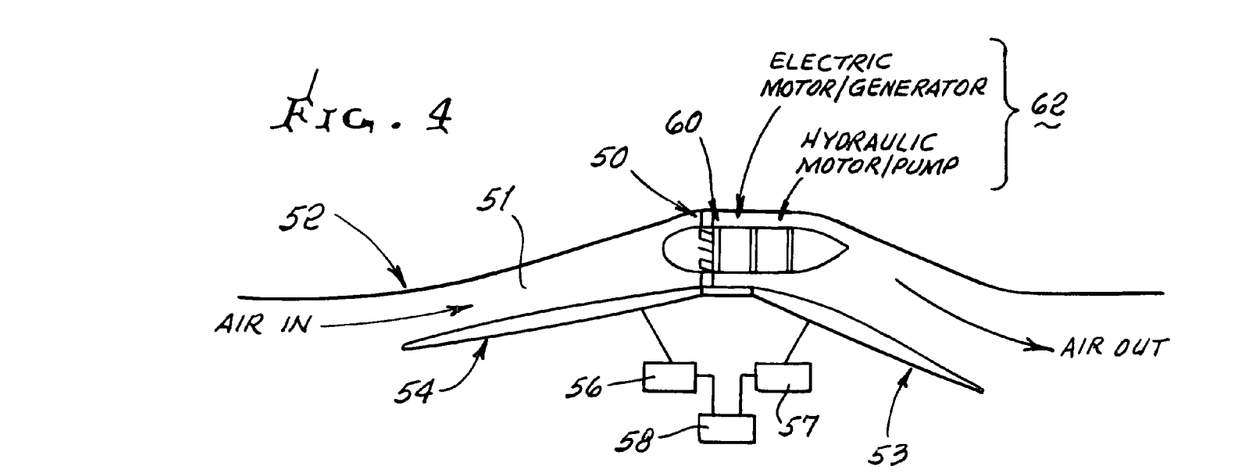
FIG. 4 is a schematic view showing a ducted ram air turbine.

As shown in FIG. 4, a one-way over-running clutch 60 is interposed between the air turbine 50 and the CMGP unit 62, such that the CMGP unit remains capable of being driven from aircraft hydraulic or electrical supplies without power from the air turbine, or suffering the loss in power from back driving the air turbine. The air turbine rotates freely from the force of air flowing through the duct 51, unless the outlet flap is opened sufficiently for the air turbine to engage the CMGP unit in response to clutch operation, and provide power to the unit. Enclosing the air turbine in a controllable duct makes it feasible to operate the air turbine continuously in normal flight regimes, including supersonic cruise speeds.

Figure 5:
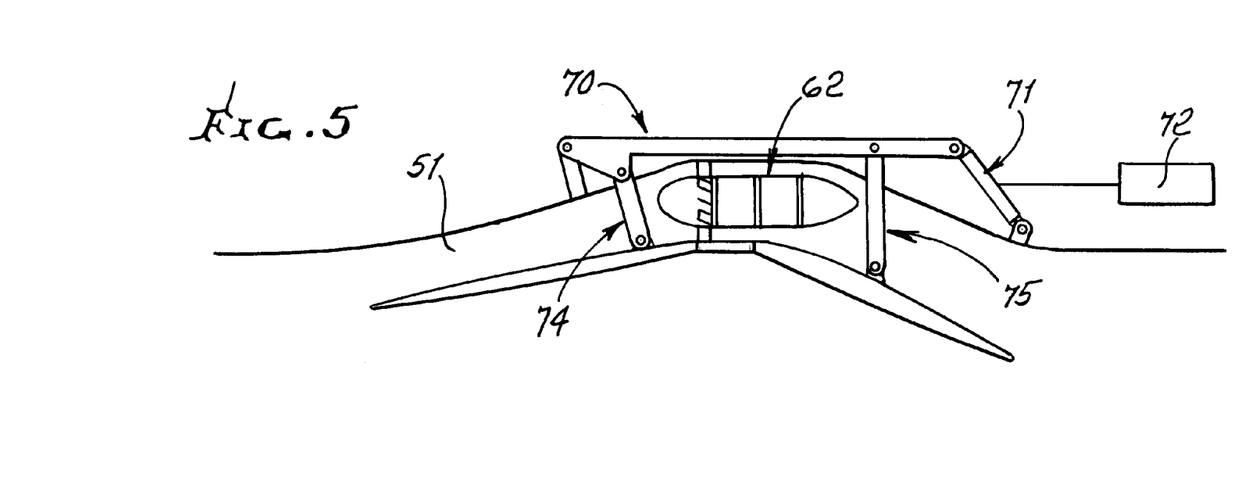
FIG. 5 is a schematic view showing air flow control mechanism, for a ducted ram air turbine.

FIG. 5 shows a linkage and actuator system to control the air drive. See main link 70, controlled by actuator 71 in turn controlled at 72; and see inlet flap drive link 74 and outlet flap drive link 75.

Figure 6A:
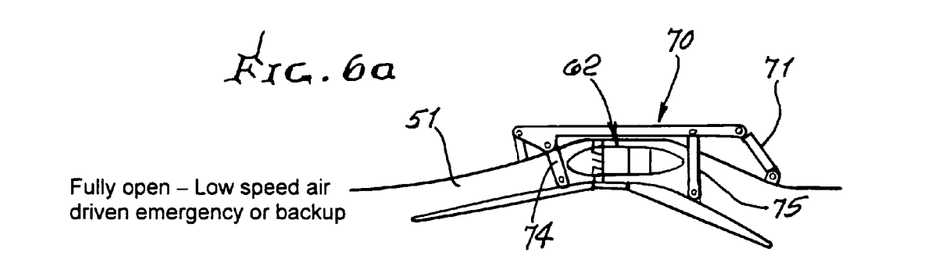
FIGS. 6(a), 6(b) and 6(c) are schematic views showing different air flap positions.
Figure 6B:
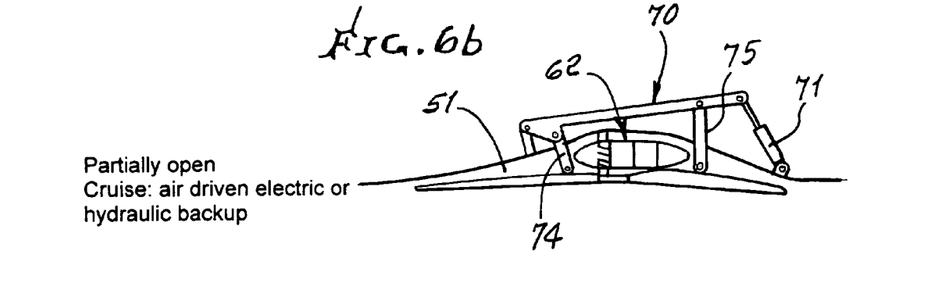
Figure 6C:
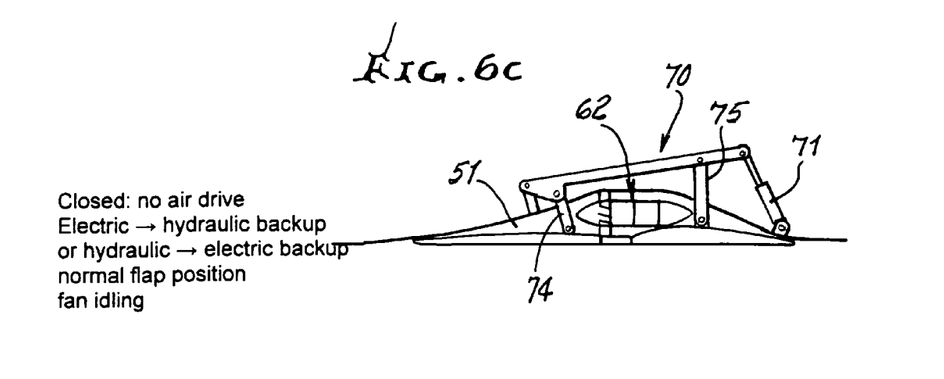

Positions of the air control flap system are illustrated in FIG. 6, at 6(a); 6(b); and 6(c).

The system is typically configured for continuous operation, providing backup electrical or hydraulic power whenever the aircraft is in flight.

Figure 7:
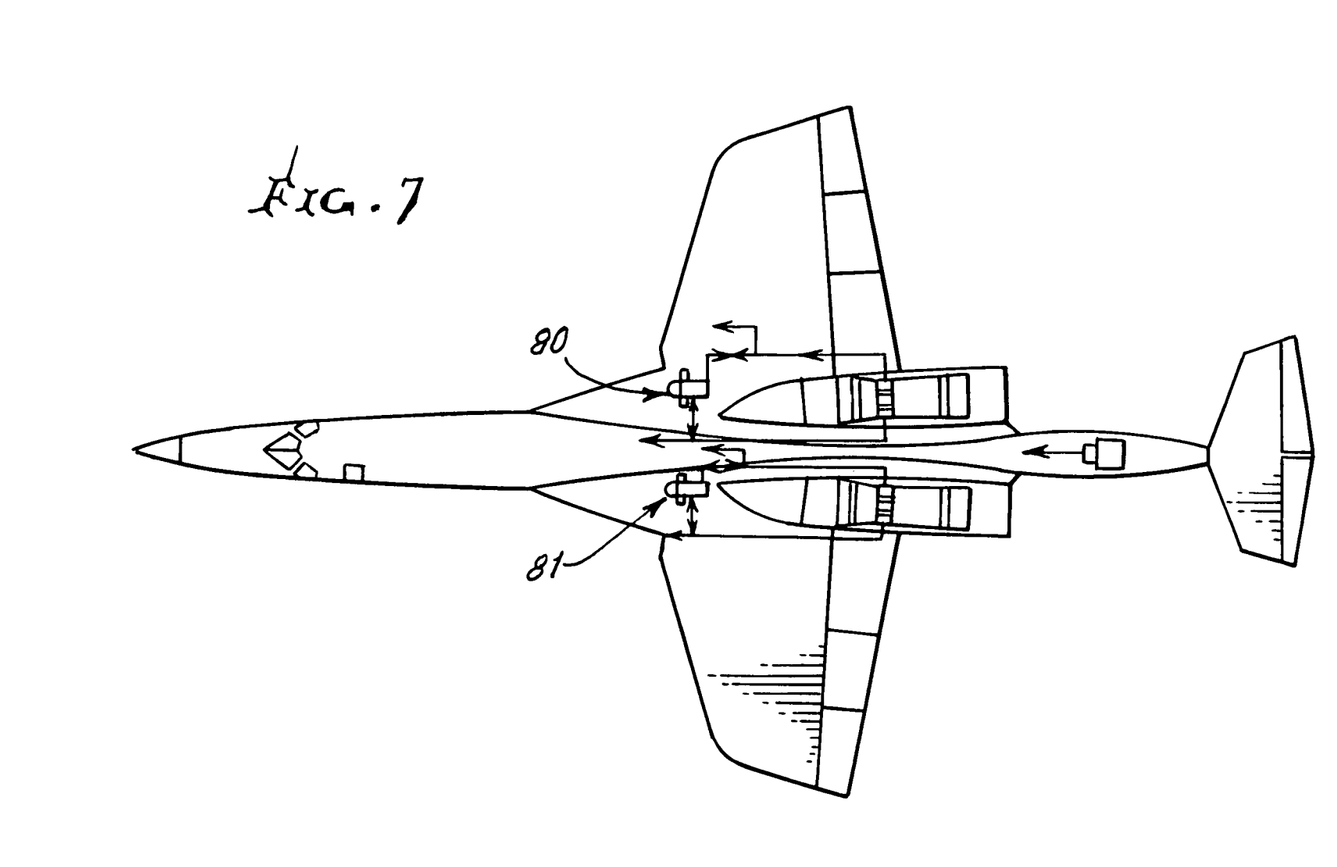
FIG. 7 is a plan view like FIG. 3, but showing a power system using a DRAT (ducted ram air turbine) backup drive.

Operation of the DRAT (ducted ram air turbine) system, as shown in FIG. 7, is described as follows:

Normal Operation: the air flaps are closed and backup generation of electric power from the aircraft main engine driven hydraulic system is provided from one CMGP unit, indicated at 80 while backup hydraulic is supplied by the second CMGP 81 unit from aircraft main engine driven electrical power. The air turbine turns at low speed from the limited air flowing through the gaps in the closed flap system and mechanical friction from the over-running clutch.

Control sensors monitor both the air turbine and CMGP unit for rotation, providing evidence of availability of the unit throughout the flight.

In the event that any engine driven pump or generator fails to provide power, the control flaps are opened and modulated to provide sufficient backup power. The system capably provides both electric and hydraulic backup power simultaneously, as long as the aircraft is in flight.

Generator or pump failure: When sensing such failure, the air flaps are deployed and modulated to provide power for any hydraulic or electric generator failure. This will incur a small drag and maximum range penalty for the aircraft.

ETOPS: The continuous availability of both electric and hydraulic power from the DRAT powered CMGP during extended over water operations precludes the need for twin engine aircraft to start and run the APU in flight. This results in reduced fuel use and exhaust emissions, as well as increasing useable range of the aircraft.

A possible disadvantage of the ducted air turbine is that it would typically operate on the reduced dynamic pressure air of the boundary layer ahead of the inlet. Past experience has shown this typically be a 20 to 40% loss in dynamic pressure available for driving the air turbine, with a consequence of requiring a larger diameter turbine and duct to process more lower energy air. This can be mitigated somewhat by provision of large exit flap openings which can provide negative base pressures of up to 20% at low exit velocity ratios. The critical condition is typically the lowest air speed in the flight envelope for which power must be provided, usually during aircraft approach and landing.

Initial estimates indicate that a 10 inch diameter air turbine could supply about 10 kVA (~15 hp) with a net 70% dynamic pressure availability at 200 knots equivalent airspeed. The short length of time at the low speed condition should allow the emergency backup batteries to make up the temporary difference in required power for the last few minutes of flight.

The system provides both electric and hydraulic backup power simultaneously during flight. It comprises rotatingly electrical power/operation and hydraulic motor/pump unit installed in an aircraft in association with the aircraft engine to be driven in response to engine operation for supplying either electrical back-up power from hydraulic input power, or hydraulic power back-up from electrical input power; means coupling the input both electrically and hydraulically to an aircraft electrical generator and to an aircraft hydraulic pump.

FIGS. 2-7 may be considered as preferred forms of the invention.

I claim:

1. In combination,
    an aircraft having an outer surface,
    a rotatively combined electrical motor/generator and hydraulic motor/pump configured to provide either hydraulic power from electrical power, or electrical power from hydraulic power, installed on said aircraft, and having one mode of operation wherein electrical power provided to the electrical motor/generator generates hydraulic power for aircraft hydraulic devices, and a second mode of operation wherein hydraulic power provided to the hydraulic motor/pump generates electrical power for aircraft electrical devices, and wherein said electrical motor/generator and hydraulic motor/pump are directly rotatively connected together free of any intervening disengageable clutch structure, and
    a ram air turbine housed inside an air flow duct within said aircraft and provided with inlet and exit openings to direct outside air to the turbine for driving said rotatively combined electrical motor/generator and hydraulic motor/pump to which the turbine is operatively connected,
    said air flow duct including an exit flap, wherein the exit flap has at least a first position that is flush with the aircraft outer surface and a second position where the exit flap is deployed away from the aircraft outer surface to induce airflow through the duct,
    said combined electrical motor/generator and hydraulic motor/pump housed inside said air flow duct.

2. The combination of claim 1, wherein said flap extends into sideward proximity to the turbine in all flap positions.

3. The combination of claim 2, including a variable inlet air flap controlled in concert with said exit flap to control air flow and power to the ram air turbine.

4. An aircraft having a ram air turbine housed inside an airflow duct within said aircraft, the duct provided with air inlet and exit openings to direct outside air to the turbine for driving one of the following installed on the aircraft and within said duct:
    a) an electric motor generator,
    b) an hydraulic pump,
    the electric motor generator and hydraulic pump configured to provide one mode of operation wherein electrical power provided to the electric motor generator generates hydraulic power for aircraft hydraulic devices, and a second mode of operation wherein hydraulic power provided to the hydraulic pump generates electrical power for aircraft electrical devices,
    there being a variable exit air flap at and proximate said exit opening to control the power of the ram air turbine, there being a variable inlet air flap controlled in conjunction with said exit flap to control air flow to and power of the ram air turbine, said inlet and outlet flaps each having at least a first position that is flush with an aircraft outer surface and a second position where the flaps are deployed away from the aircraft outer surface to induce airflow through the duct.

5. The combination of claim 4 wherein said ram air turbine, electric motor generator and hydraulic pump are rotatively connected and configured such that hydraulic power supplied from the aircraft to the hydraulic pump is usable to drive the electric motor generator to supply electric power, and alternatively electrical power supplied from the aircraft is usable to drive the hydraulic pump to supply hydraulic power to the aircraft, independent of the ram air turbine.

6. In combination with an aircraft having a body with an outer surface,
    a ram air turbine housed inside an airflow duct within said aircraft and provided with inlet and exit openings to direct outside air to the turbine for driving an electrical generator and hydraulic pump in combination, wherein the turbine is operatively connected to the electrical generator and the hydraulic pump, and each of the turbine the electrical generator and the hydraulic pump are within the duct, the electrical generator and hydraulic pump are configured to provide one mode of operation wherein electric power provided to the electrical generator generates hydraulic power for aircraft hydraulic devices, and a second mode of operation wherein hydraulic power provided to the hydraulic pump generates electrical power for aircraft electrical devices,
    there being a variably movable exit flap to control the power of the ram air turbine, said exit flap having a trailing edge that can be moved into an airstream adjacent to the aircraft body, said exit flap having at least a first position that is flush with the aircraft outer surface and a second position where the exit flap is deployed away from the aircraft outer surface to induce airflow.

7. The combination of claim 6 wherein said flap defines one side of the duct along the entire length of the flap.

* * * * *